(12) United States Patent
Lee et al.

(10) Patent No.: US 8,435,666 B2
(45) Date of Patent: May 7, 2013

(54) BATTERY MODULE WITH EXCELLENT COOLING EFFICIENCY AND COMPACT STRUCTURE AND MIDDLE OR LARGE-SIZED BATTERY PACK

(75) Inventors: Jinkyu Lee, Busan (KR); Hee Soo Yoon, Daejeon (KR); BumHyun Lee, Seoul (KR); Dal Mo Kang, Daejeon (KR); Minjung Kim, Suwon-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/324,871

(22) Filed: Dec. 13, 2011

(65) Prior Publication Data

US 2012/0177965 A1 Jul. 12, 2012

Related U.S. Application Data

(63) Continuation of application No. PCT/KR2010/008304, filed on Nov. 23, 2010.

(30) Foreign Application Priority Data

Dec. 4, 2009 (KR) ................ 10-2009-0119925

(51) Int. Cl.
- *H01M 2/14* (2006.01)
- *H01M 2/00* (2006.01)
- *H01M 6/42* (2006.01)
- *H01M 6/46* (2006.01)
- *H01M 2/02* (2006.01)

(52) U.S. Cl.
USPC ........... 429/120; 429/148; 429/149; 429/153; 429/166; 429/177

(58) Field of Classification Search .................. 429/120, 429/177, 186, 148, 149, 153, 166
See application file for complete search history.

(56) References Cited

U.S. PATENT DOCUMENTS

| | | | |
|---|---|---|---|
| 2001/0026886 A1* | 10/2001 | Inui et al. | 429/120 |
| 2006/0060236 A1 | 3/2006 | Kim | |
| 2007/0124980 A1 | 6/2007 | Yang | |
| 2009/0111010 A1* | 4/2009 | Okada et al. | 429/120 |
| 2009/0208828 A1* | 8/2009 | Kanai et al. | 429/120 |
| 2011/0024207 A1 | 2/2011 | Higashino et al. | |

FOREIGN PATENT DOCUMENTS

| | | |
|---|---|---|
| JP | 2005-116429 A | 4/2005 |
| JP | 2006-93155 A | 4/2006 |
| JP | 2009-277646 A | 11/2009 |
| KR | 1020070057345 A | 6/2007 |
| KR | 10-2009-0010393 A | 1/2009 |

OTHER PUBLICATIONS

International Search Report issued in PCT/KR2010/008304, dated Aug. 25, 2011.

* cited by examiner

*Primary Examiner* — Patrick Ryan
*Assistant Examiner* — Julian Anthony
(74) *Attorney, Agent, or Firm* — Birch, Stewart, Kolasch & Birch, LLP

(57) ABSTRACT

Disclosed herein is a battery module including a plurality of battery cells mounted in a module case in a stacked state, wherein cooling members are mounted at interfaces between the battery cells, the module case is configured in a structure in which two opposite sides of the module case are open so that corresponding portions of the battery cell stack are exposed outward through the two open opposite sides of the module case, the cooling members are partially exposed outward through the two open opposite sides of the module case, and a coolant flows along the two open opposite sides of the module case while contacting the outwardly exposed portions of the cooling members.

18 Claims, 3 Drawing Sheets

BATTERY MODULE WITH EXCELLENT COOLING EFFICIENCY AND COMPACT STRUCTURE AND MIDDLE OR LARGE-SIZED BATTERY PACK

CROSS REFERENCE TO RELATED APPLICATIONS

This application is a Continuation of PCT International Application No. PCT/KR2010/008304 filed on Nov. 23, 2010, which claims priority under 35 U.S.C. §119(a) to Patent Application No. 10-2009-0119925 filed in the Republic of Korea on Dec. 4, 2009, all of which are hereby expressly incorporated by reference into the present application.

TECHNICAL FIELD

The present invention relates to a battery module with excellent cooling efficiency and of a compact structure and a middle or large-sized battery pack including the same, and, more particularly, to a battery module including a plurality of battery cells mounted in a module case in a stacked state, wherein cooling members are mounted at interfaces between the battery cells, the module case is configured in a structure in which two opposite sides of the module case are open so that corresponding portions of the battery cell stack are exposed outward through the two open opposite sides of the module case, the cooling members are partially exposed outward through the two open opposite sides of the module case, and a coolant flows along the two open opposite sides of the module case while contacting the outwardly exposed portions of the cooling members.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit cell) of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is easy to modify the shape of the pouch-shaped battery.

Battery cells constituting such a middle or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof with the result that it is difficult to effectively lower the overall temperature of the battery cells.

That is, if the heat, generated from the battery module during the charge and discharge of the battery module, is not effectively removed from the battery module, the heat accumulates in the battery module with the result that deterioration of the battery module is accelerated. According to circumstances, the battery module may catch fire or explode. For this reason, a cooling system is needed in a high-power, large-capacity battery pack to cool battery cells mounted in the battery pack.

Each battery module mounted in a middle or large-sized battery pack is generally manufactured by stacking a plurality of battery cells with high integration. In this case, the battery cells are stacked in a state in which the battery cells are arranged at predetermined intervals so that heat generated during the charge and discharge of the battery cells is removed. For example, the battery cells may be sequentially stacked in a state in which the battery cells are arranged at predetermined intervals without using an additional member. Alternatively, in a case in which the battery cells have low mechanical strength, one or more battery cells are mounted in a battery cartridge, and a plurality of battery cartridges is stacked to constitute a battery module. Coolant channels may be defined between the stacked battery cells or between the stacked battery modules so that heat accumulating between the stacked battery cells or between the stacked battery modules is effectively removed.

In this structure, however, it is necessary to provide a plurality of coolant channels corresponding to the number of the battery cells with the result that the overall size of the battery module is increased.

Also, in a case in which a plurality of battery cells is stacked, the intervals of the coolant channels are relatively narrowed in consideration of the size of the battery module. As a result, design of the cooling structure is complicated. That is, high pressure loss is caused by the coolant channels arranged at intervals narrower than a coolant inlet port with the result that it is difficult to design shapes and positions of the coolant inlet port and a coolant outlet port. Also, a fan may be further provided to prevent such pressure loss, and therefore, design may be restricted due to power consumption, fan noise, space or the like.

Consequently, there is a high necessity for a battery module which provides high power and large capacity, which can be manufactured in a simple and compact structure, and which exhibits excellent life span and safety based on high cooling efficiency.

DISCLOSURE

Technical Problem

Therefore, the present invention has been made to solve the above problems, and other technical problems that have yet to be resolved.

Specifically, it is an object of the present invention to provide a battery module configured in a structure in which two major surfaces of a module case are open, and high thermal conductivity is achieved by a specific structure of cooling members, thereby maximizing cooling efficiency while minimizing the overall size of the battery module.

Technical Solution

In accordance with one aspect of the present invention, the above and other objects can be accomplished by the provision of a battery module including a plurality of battery cells mounted in a module case in a stacked state, wherein cooling members are mounted at interfaces between the battery cells, the module case is configured in a structure in which two opposite sides of the module case are open so that corresponding portions of the battery cell stack are exposed outward through the two open opposite sides of the module case, the cooling members are partially exposed outward through the two open opposite sides of the module case, and a coolant flows along the two open opposite sides of the module case while contacting the outwardly exposed portions of the cooling members.

Generally, a battery module is configured in a structure in which battery cells are stacked while being arranged at predetermined intervals to form coolant channels so that a coolant, such as air, flows in the spaces defined between the respective battery cells to prevent overheating of the battery cells. Also, a coolant inlet port and a coolant outlet port are provided at one side of the battery module, and a duct is provided to achieve smooth flow of the coolant. As needed, a cooling fan to drive the coolant is further provided.

In the battery module according to the present invention, on the other hand, the cooling members are disposed at the interfaces between the respective battery cells, and the cooling members are mounted in the module case so that the cooling members are partially exposed outward. Consequently, it is possible to achieve high cooling efficiency without using a large number of members Also, it is possible to effectively discharge heat generated from the battery cells to the outside without using a conventional cooling system. Consequently, it is possible to configure the battery module in a very compact structure.

Preferably, each of the battery cells is configured in a plate-shaped structure having a small thickness and a relatively large width and length so that the overall size of the battery cells is minimized when the battery cells are stacked to constitute a battery module.

Each of the battery cells may be a lightweight pouch-shaped battery including an electrode assembly mounted in a battery case formed of a laminate sheet including an inner resin layer which is thermally weldable, an isolation metal layer, and an outer resin layer exhibiting excellent durability.

In a preferred example, the battery cells may be mounted in the module case in a state in which the battery cells are stacked so that opposite sides of each of the battery cells face the two open opposite sides of the module case. In this stacked structure, the opposite sides of all of the battery cells are exposed outward, and, when the cooling members are disposed between the respective battery cells, the outwardly exposed portions of the cooling members effectively cool the battery cells through thermal conduction.

The module case may be configured in a structure in which the top and bottom of the module case are open so that the cooling members disposed between the respective battery cells are partially exposed outward with ease. Consequently, it is possible to effectively discharge heat to the outside through the open top and bottom of the module case without the provision of an additional coolant inlet port and an additional coolant outlet port.

Each of the cooling members may include a main body part disposed at the interface between the corresponding battery cells, a connection part successively connected to one end or opposite ends of the main body part in a state in which the connection part is exposed outward from the stacked battery cells, and a perpendicularly bent part extending from one end of the connection part in one direction or in opposite directions.

That is, each of the cooling members includes the main body part, the connection part and the perpendicularly bent part all of which are configured in specific structures as defined above. Also, cooling members configured in various forms may be mounted at the interfaces between the respective battery cells so as to further improve cooling efficiency.

The material for each of the cooling members is not particularly restricted so long as each of the cooling members is formed of a thermally conductive material. For example, each of the cooling members may be formed of a metal sheet exhibiting high thermal conductivity. The cooling members may be disposed at all of the interfaces between the battery cells or at some of the interfaces between the battery cells. For example, in a case in which the cooling members are disposed at all of the interfaces between the battery cells, the respective battery cells may be in contact with different cooling members at opposite sides thereof. On the other hand, in a case in which the cooling members are disposed at some of the interfaces between the battery cells, some of the battery cells may be in contact with the cooling members only at one side thereof.

As an example of the structure of each of the cooling members mounted at the interfaces between the respective battery cells, each of the cooling members may be configured in a structure in which the connection part is formed at only one end of the main body part and the perpendicularly bent part extends from the end of the connection part in opposite directions, and the cooling members may be mounted at the interfaces between the respective battery cells so that the perpendicularly bent parts are alternately disposed at opposite sides of the battery cell stack.

That is, the cooling members are mounted between the respective battery cells so that the perpendicularly bent parts alternately cover the opposite sides of the battery cell while the perpendicularly bent parts are spaced apart from each other. Consequently, it is possible to maximize cooling efficiency through thermal conduction.

As another example, each of the cooling members may be configured in a structure in which the connection part is formed at opposite ends of the main body part, and the perpendicularly bent part extends from the end of the connection part in opposite directions, and the cooling members may be mounted at the interfaces between the respective battery cells at intervals at which the perpendicularly bent parts do not overlap at opposite sides of the battery cell stack. That is, it is possible to adjust the number of the cooling members disposed between the respective battery cells at intervals at which the perpendicularly bent parts do not overlap based on the width of each of the perpendicularly bent parts extending in opposite directions.

According to circumstances, cooling members, each of which is configured in a structure in which a perpendicularly bent part extends from one end of a connection part in one direction, may be further mounted at the outside of the battery cell stack so as to improve a cooling effect at the outside of the battery cell stack.

The structure and shape of the cooling members is not particularly restricted so long as the cooling members are mounted at the interfaces between the respective battery cells so as to improve cooling efficiency. That is, the cooling member may be configured in various structures or various shapes.

Meanwhile, the cooling efficiency of each of the cooling members is influenced by the surface area of each of the cooling members. Here, the surface area of each of the cooling members means the sum of areas of the main body part, the connection part and the perpendicularly bent part. In this aspect, the main body part of each of the cooling members disposed at the interfaces between the respective battery cells may have a size equivalent to 70 to 120% of the area of one major surface of each of the battery cells.

If the size of the main body part is too small, it is difficult to easily transfer heat generated from the battery cells. If the size of the main body part is too large, on the other hand, the overall size of the battery module is increased, which is not preferable.

In particular, in the battery module according to the present invention, the connection part, which is exposed outward from the main body part of each of the cooling members through the two open opposite sides of the module case via the perpendicularly bent part, acts as a bottleneck section in heat transfer, and therefore, thermal conductivity from the main body part to the perpendicularly bent part and to the outside is greatly changeable according to the structure of the connection part.

In particular, the connection part of each of the cooling members may have a predetermined length so that the connection part is exposed outward from the battery cells. Preferably, the connection part of each of the cooling members has a length equivalent to 0.05 to 0.3 times the length of the main body part of each of the cooling members.

If the length of the connection part is too small, the amount of a coolant directly contacting the corresponding battery cells and the connection part is small with the result that effective cooling is not achieved. If the length of the connection part is too large, on the other hand, the size of the battery module is increased, which is not preferable.

The connection part functions as a heat dissipation member as well as a route through which a coolant flows to the perpendicularly bent part. Consequently, it is possible to achieve an excellent cooling effect with high reliability as compared with a conventional cooling structure.

In addition, the surface area of each of the cooling members is influenced by the thickness of the connection part and the width of the perpendicularly bent part.

In particular, in a case in which the thickness of the connection part is greater than the thickness of the main body part, heat transfer to the outside becomes easier. Therefore, the connection part of each of the cooling members may have a thickness equivalent to 1.2 to 8.0 times the thickness of the main body part of each of the cooling members so as to maximize such an effect.

In various structures, the thickness of the connection part may be greater than the thickness of the main body part.

As an example, the connection part of each of the cooling members may be configured in a structure in which a thickness of the connection part at the main body part side thereof is equal to the thickness of the connection part at the perpendicularly bent part side thereof while the connection part of each of the cooling members has the above-defined thickness range.

As another example, the connection part of each of the cooling members may be configured in a structure in which the connection part has am increasing thickness from the main body part side thereof to the perpendicularly bent part side thereof. For example, the connection part of each of the cooling members may be configured in, but is not limited to, a symmetrical arch structure in vertical section.

Meanwhile, the battery cells, which are mounted in the module case in a stacked state, may be mounted in a battery cartridge configured, for example, in a frame structure. This structure is preferably applied to a battery having sealing portions formed at the edge of the battery by thermal welding.

In the above structure, the battery cartridge includes at least one pair of plate-shaped frames to fix the edge of a corresponding one of the battery cells in a state in which at least one major surface of the corresponding one of the battery cells is exposed, and the frames are provided at the outsides thereof with elastic pressing members to fix a corresponding one of the cooling members to the exposed major surface of the corresponding one of the battery cells in a tight contact manner.

Therefore, in a case in which a plurality of battery cartridges, in which battery cells are mounted, are stacked, and cooling members are disposed between the respective battery cartridges, the elastic pressing members provided at the outsides of the frames increase structural stability of the battery cartridge stack and enable the cooling members to be effectively fixed to the battery cartridge stack.

The material for the elastic pressing members mounted at the outsides of the frames is not particularly restricted so long as the elastic pressing members exhibit high elastic pressing force when the elastic pressing members are pressed. Preferably, each of the elastic pressing members is formed of an elastic polymer resin. Such a polymer resin may be a material that is capable of exhibiting high elastic force or may have a structure or shape that is capable of exhibiting high elastic force. A representative example of the former may be rubber, and a representative example of the latter may be foamed polymer resin.

Each of the elastic pressing members may have a width equivalent to 10% or more of the width of each of the frames. If the width of each of the elastic pressing members is too small as compared with the width of each of the frames, an effect obtained by mounting the elastic pressing members to the frames may not be exhibited. On the other hand, if the width of each of the elastic pressing members is too large as compared with the width of each of the frames, the elastic pressing members, which are elastically deformed when the elastic pressing members are pressed, cover large portions of the cooling members with the result that a heat dissipation effect may be lowered. Furthermore, the elastic pressing members may protrude out of the frames when the elastic pressing members are pressed, which is not preferable. Of course, therefore, the width of each of the elastic pressing members may exceed the above defined range unless the above problems are caused.

Meanwhile, a middle or large-sized battery pack uses a plurality of battery cells in order to provide high power and large capacity. In battery modules constituting such a battery pack, higher heat dissipation efficiency is needed to secure safety of the battery pack.

In accordance with another aspect of the present invention, therefore, there is provided a middle or large-sized battery pack manufactured by combining two or more battery modules based on desired power and capacity.

The battery pack according to the present invention includes a plurality of battery cells in order to provide high power and large capacity. Consequently, the battery pack according to the present invention is preferably used as a power source for electric vehicles, hybrid electric vehicles, or plug-in hybrid electric vehicles in which high-temperature heat generated during the charge and discharge of the battery cells is a serious safety concern.

In particular for electric bicycles and electric scooters, in which a battery pack may be easily exposed to the outside, high cooling performance may be achieved from the flow of air generated based on the speed of a vehicle. In this aspect, the battery pack according to the present invention is more preferably used in the electric bicycles and the electric scooters.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
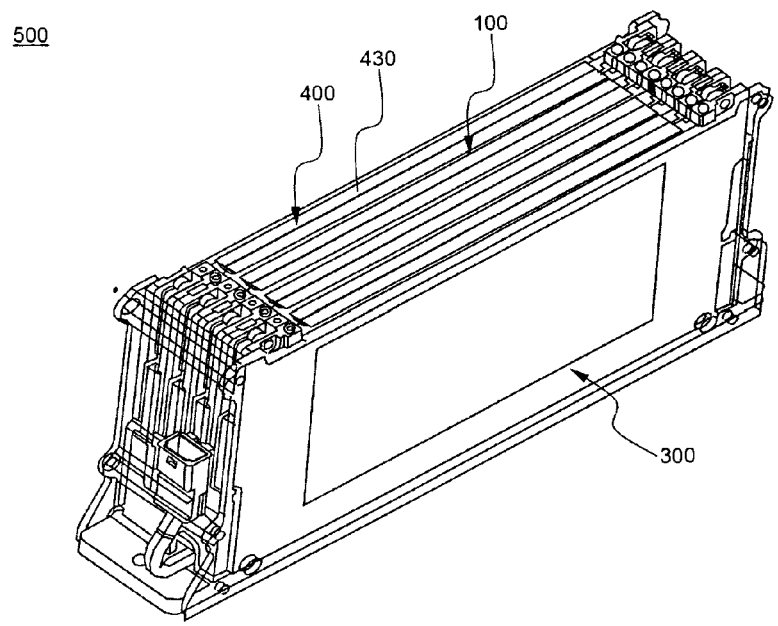
FIG. 1 is a typical view illustrating a battery module according to an embodiment of the present invention.
Figure 2:
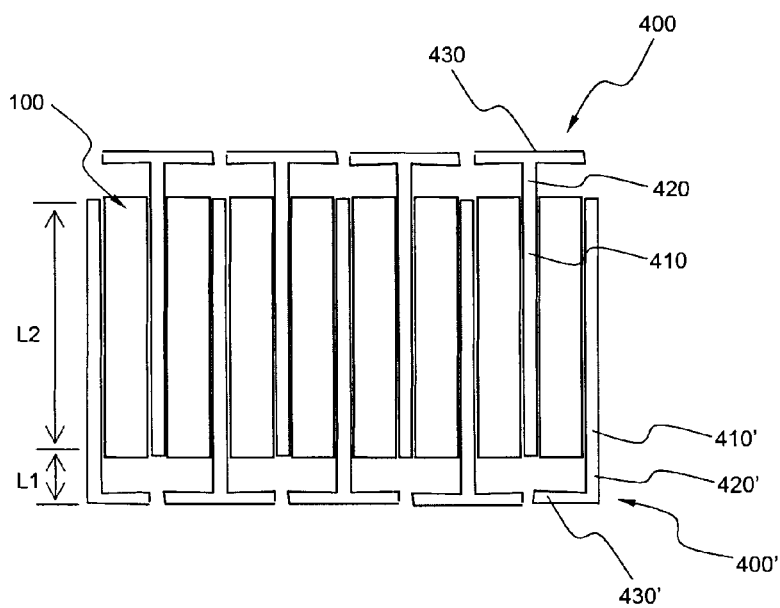
FIG. 2 is a typical view illustrating a structure in which cooling members of FIG. 1 are mounted at interfaces between battery cells.

FIG. 1 is a typical view illustrating a battery module according to an embodiment of the present invention, and FIG. 2 is a typical view illustrating a structure in which cooling members of FIG. 1 are mounted at interfaces between battery cells.

Referring to these drawings, a battery module 500 is configured in a structure in which a plurality of battery cells 100 is mounted in a module case 300 in a stacked state, and cooling members 400 are mounted at interfaces between the battery cells 100.

The module case 300 is configured in a structure in which the top and bottom of the module case 300 are open. The battery cells 100 are mounted in the module case 300 in a state in which the battery cells 100 are stacked so that opposite sides of each of the battery cells 100 face the open top and the open bottom of the module case 300.

Each of the cooling members 400 is formed of a metal sheet exhibiting high thermal conductivity. Each of the cooling members 400 includes a main body part 410 disposed at the interface between the corresponding battery cells 100, a connection part 420 successively connected to one end of the main body part 410 in a state in which the connection part 420 is exposed outward from the stacked battery cells 100, and a perpendicularly bent part 430 extending from one end of the connection part 420 in opposite directions.

The cooling members 400 are mounted at the interfaces between the respective battery cells 100 so that the perpendicularly bent parts 430 are alternately disposed at opposite sides of the battery cell stack. Also, cooling members 400', each of which is configured in a structure in which a perpendicularly bent part 430' extends from one end of a connection part 420' in one direction (toward the battery cells), are further mounted at the outside of the battery cell stack.

The length L1 of the connection part 410 of each of the cooling members 400 is equivalent to approximately 10% of the length L2 of the main body part 410 of each of the cooling members 400. The main body part 410 has a size equivalent to approximately 100% of the area of one major surface of each of the battery cells 100.

Since the perpendicularly bent parts 430 of the cooling members 400 are exposed through the open top and the open bottom of the module case 300, a coolant flows along the open top and the open bottom of the module case 300 while contacting the perpendicularly bent parts 430, which are exposed outward, of the cooling members 400. According to circumstances, some of the coolant may flow while contacting the connection parts 420 spaced apart from the battery cells 100.

Consequently, heat transferred from the cooling members is easily discharged to the outside through the module case 300, the top and bottom of which are open, without the provision of a conventional complicated cooling system, thereby achieving excellent cooling efficiency while the battery module is configured in a compact structure.

Figure 3:
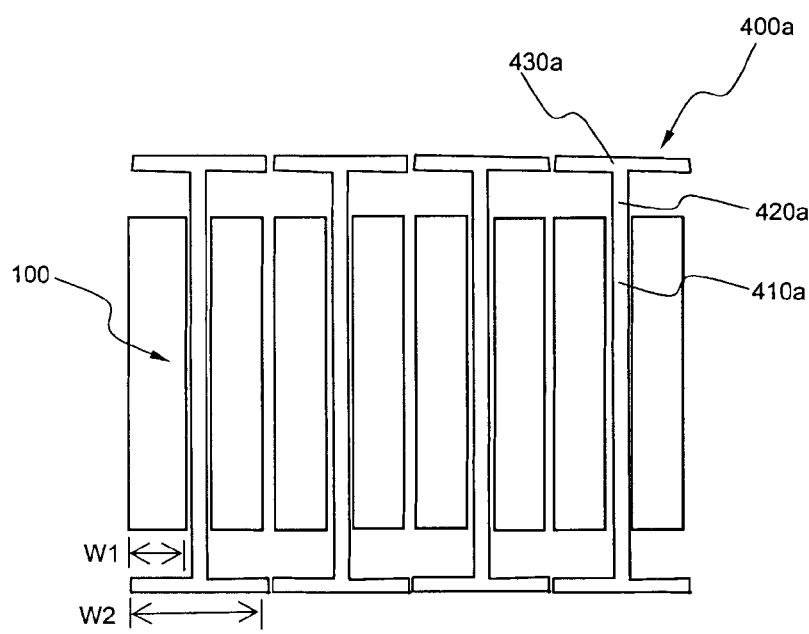
FIG. 3 is a typical view illustrating a structure in which cooling members configured in another form are mounted at the interfaces between the battery cells.

FIG. 3 is a front view typically illustrating a structure in which cooling members 400a configured in another form are mounted at the interfaces between the battery cells.

Referring to FIG. 3 together with FIG. 1, each of the cooling members 400a includes a main body part 410a disposed at the interface between the corresponding battery cells 100, connection parts 420a successively connected to opposite ends of the main body part 410a in a state in which the connection parts 420a are exposed outward from the stacked battery cells 100, and perpendicularly bent parts 430a extending from ends of the connection parts 420 in opposite directions.

The width W2 of each of the perpendicularly bent parts 430a is approximately twice the width W1 of each of the battery cells 100. Of course, the width W2 of each of the perpendicularly bent parts 430a may be less than twice the width W1 of each of the battery cells 100. Consequently, it is possible to easily adjust the number of the cooling members 400a disposed between the respective battery cells 100 based on the width of each of the perpendicularly bent parts 430a.

Other components of each of the cooling members are identical to those shown in FIG. 2, and a detailed description thereof will not be given.

Figure 4:
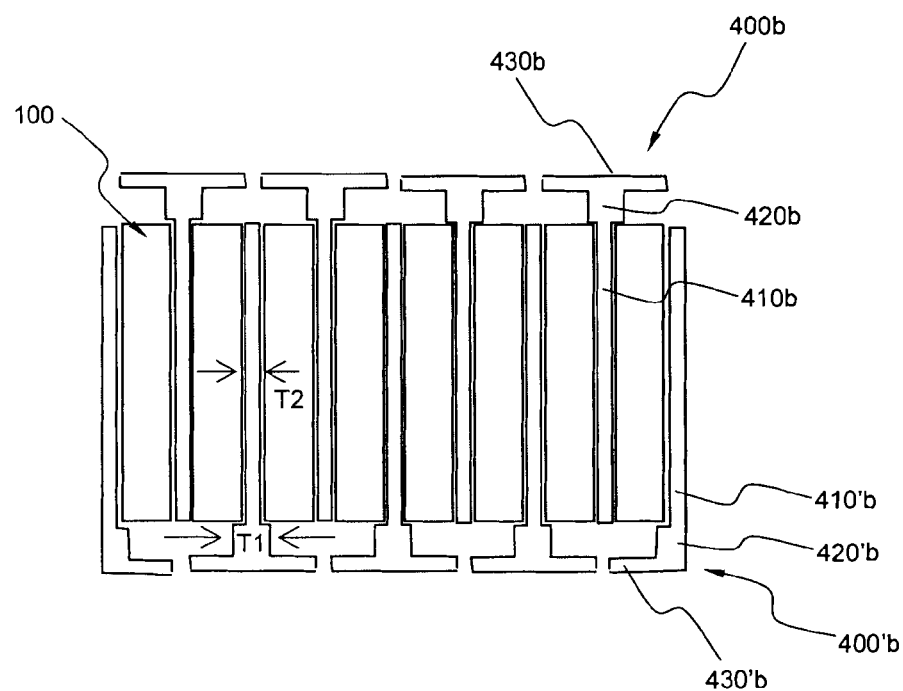
FIG. 4 is a typical view illustrating a structure in which cooling members configured in a further form are mounted at the interfaces between the battery cells.

FIG. 4 is a front view typically illustrating a structure in which cooling members 400b configured in a further form are mounted at the interfaces between the battery cells.

Referring to FIG. 4 together with FIG. 1, the thickness T1 of a connection part 420b of each of the cooling members 400b is greater than the thickness T2 of a main body part 410b of each of the cooling members 400b. Also, the thickness of a connection part of each cooling member 400'b mounted at the outside of the battery cell stack may be greater than the thickness of a main body part of each of the cooling members 400'b.

Since the thickness T1 of the connection part 420b is greater than the thickness T2 of the main body part 410b, thermal conductivity from the main body part 410b to a perpendicularly bent part 430b is further improved.

As described above, the cooling members are designed so as to exhibit the optimum cooling efficiency, thereby improving cooling efficiency of the battery module. The shape and arrangement of the cooling members may be various.

Figure 5:
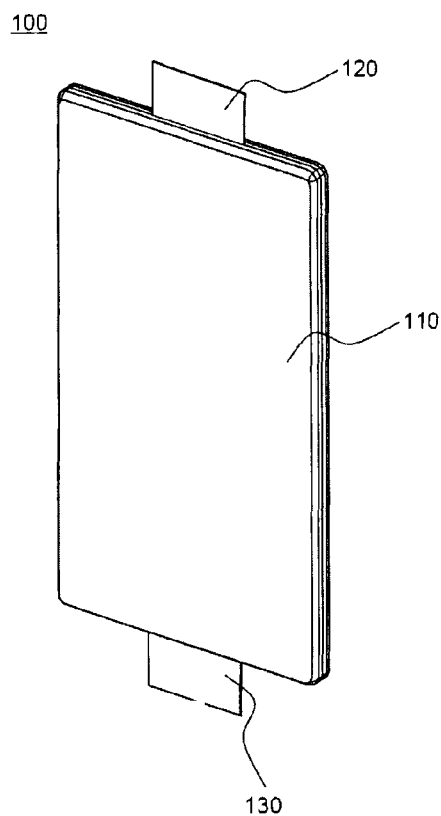
FIG. 5 is a typical view illustrating a plate-shaped battery cell.

FIG. 5 is a typical view illustrating am exemplary plate-shaped battery cell which may be used in the battery module according to the present invention.

Referring to FIG. 5, a plate-shaped battery cell 100 includes an electrode assembly (not shown) of a cathode/separator/anode structure mounted in a battery case 110 formed of a laminate sheet including a resin layer and a metal layer. A cathode terminal 120 and an anode terminal 130, electrically connected to the electrode assembly, protrude outward from the upper end and the lower end of the battery case 110, respectively. For simplicity of illustration, a sealing portion formed at the edge of the battery case 110 by thermal welding is not shown.

Since the battery case 110 includes the resin layer, dissipation of heat from the battery cell is not easy as compared with a metal case. In particular, in a battery module including a plurality of stacked battery cells 100, performance and safety of the battery module may be deteriorated due to low heat dissipation.

Figure 6:
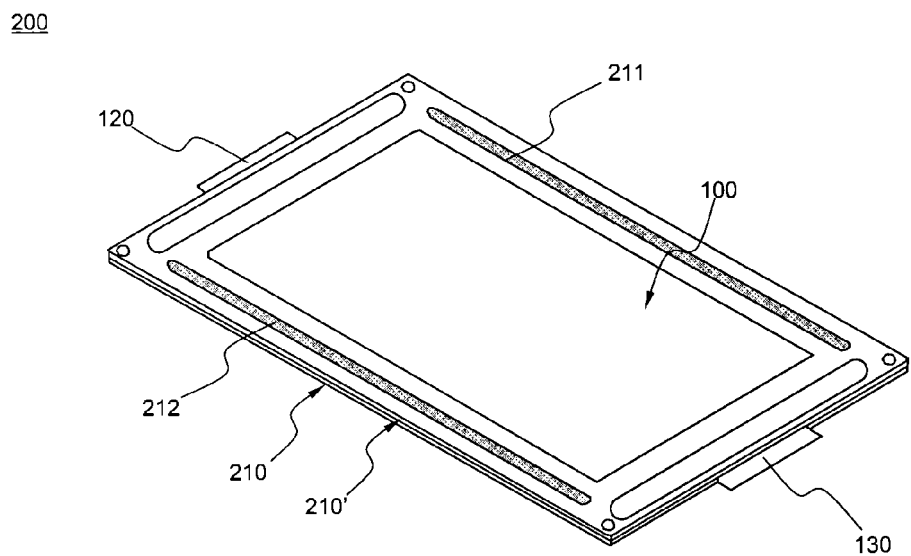
FIG. 6 is a typical plan view illustrating a battery cartridge.

FIG. 6 is a typical plan view illustrating a battery cartridge which may be used in the battery module according to the present invention.

Referring to FIG. 6 together with FIG. 1, a battery cartridge 200 is configured in a structure in which a plate-shaped battery cell 100 is mounted in the battery cartridge 200, and electrode terminals 120 and 130 of the battery cell 100 protrude outward from the battery cartridge 200.

The battery cartridge 200 includes a pair of plate-shaped frames 210 and 210' configured to fix opposite sides (for example, sealing portions) of the battery cell 100 at the edge thereof in a state in which opposite major surfaces of the battery cell 100 are exposed.

The respective frames 210 and 210' are provided at left and right side parts of the outsides thereof with elastic pressing members 211 and 212, which extend in parallel in the longitudinal direction of the respective frames 210 and 210'.

Consequently, heat generated from battery cells 100 during the charge and discharge of the battery cells 100 is transferred to the main body parts of the cooling members 400 disposed between the respective battery cartridges 200 and is then discharged to the outside through the perpendicularly bent parts 430 of the cooling members 400, thereby achieving high cooling efficiency while the battery module is configured in a compact structure.

INDUSTRIAL APPLICABILITY

As is apparent from the above description, the battery module according to the present invention is configured in a structure in which cooling members to accelerate cooling of battery cells are disposed at interfaces between the battery cells, and the cooling members are mounted in a module case so that perpendicularly bent parts of the cooling members are exposed outward. Consequently, it is possible to effectively discharge heat generated from the battery cells to the outside while minimizing the increase in size of the battery module.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module comprising a plurality of battery cells mounted in a module case in a stacked state, wherein
cooling members are mounted at interfaces between the battery cells,
the module case is configured in a structure in which two opposite sides of the module case are open so that corresponding portions of the battery cell stack are exposed outward through the two open opposite sides of the module case,
the cooling members are partially exposed outward through the two open opposite sides of the module case, and
a coolant flows along the two open opposite sides of the module case while contacting the outwardly exposed portions of the cooling members,
wherein each of the cooling members comprises:
a main body part disposed at the interface between the corresponding battery cells in a contact manner with both sides of the battery cells without any separate space;
a connection part successively connected to one end or opposite ends of the main body part in a state in which the connection part is exposed outward from the stacked battery cells; and
a perpendicularly bent part extending from one end of the connection part in one direction or in opposite directions, and
wherein each of the cooling members is formed of a metal sheet exhibiting thermal conductivity.

2. The battery module according to claim 1, wherein each of the battery cells is configured in a plate-shaped structure in which an electrode assembly is mounted in a battery case formed of a laminate sheet.

3. The battery module according to claim 2, wherein the laminate sheet comprises an inner resin layer which is thermally weldable, an isolation metal layer, and an outer resin layer exhibiting durability.

4. The battery module according to claim 1, wherein the battery cells are mounted in the module case in a state in which the battery cells are stacked so that opposite sides of each of the battery cells face the two open opposite sides of the module case.

5. The battery module according to claim 1, wherein the module case is configured in a structure in which a top and a bottom of the module case are open.

6. The battery module according to claim 1, wherein each of the cooling members is configured in a structure in which the connection part is formed at only one end of the main body part and the perpendicularly bent part extends from the end of the connection part in opposite directions, and the cooling members are mounted at the interfaces between the respective battery cells so that the perpendicularly bent parts are alternately disposed at opposite sides of the battery cell stack.

7. The battery module according to claim 1, wherein each of the cooling members is configured in a structure in which the connection part is formed at opposite ends of the main body part and the perpendicularly bent part extends from the end of the connection part in opposite directions, and the cooling members are mounted at the interfaces between the respective battery cells at intervals at which the perpendicularly bent parts do not overlap at opposite sides of the battery cell stack.

8. The battery module according to claim 1, wherein cooling members, each of which is configured in a structure in which a perpendicularly bent part extends from one end of a connection part in one direction, are further mounted at the outside of the battery cell stack.

9. The battery module according to claim 1, wherein the main body part of each of the cooling members has a size equivalent to 70 to 120% of an area of a major surface of each of the battery cells.

10. The battery module according to claim 1, wherein the connection part of each of the cooling members has a length equivalent to 0.05 to 0.3 times a length of the main body part of each of the cooling members.

11. The battery module according to claim 1, wherein the connection part of each of the cooling members has a greater thickness than the main body part of each of the cooling members.

12. The battery module according to claim 11, wherein the connection part of each of the cooling members is configured in a structure in which a thickness of the connection part at the main body part side thereof is equal to the thickness of the connection part at the perpendicularly bent part side thereof.

13. The battery module according to claim 11, wherein the connection part of each of the cooling members is configured in a structure in which the connection part has an increasing thickness from the main body part side thereof to the perpendicularly bent part side thereof.

14. The battery module according to claim 11, wherein the connection part of each of the cooling members is configured in a symmetrical arch structure in vertical section.

15. The battery module according to claim 1, wherein at least one of the battery cells is mounted in a battery cartridge configured in a frame structure.

16. The battery module according to claim 15, wherein the battery cartridge comprises at least one pair of plate-shaped frames to fix an edge of at least one of the battery cells in a state in which at least one major surface of the at least one of the battery cells is exposed, and each of the frames is provided at an outside thereof with elastic pressing members to fix a corresponding one of the cooling members to the exposed major surface of the at least one of the battery cells in a contact manner.

17. A battery pack comprising two or more battery modules according to claim 1, the number of the battery modules being set based on power and capacity of the battery pack.

18. The battery pack according to claim 17, wherein the battery pack is used as a power source for electric vehicles, hybrid electric vehicles, plug-in hybrid electric vehicles, electric bicycles or electric scooters.

* * * * *